United States Patent [19]

Binns

[11] E Re. 31,198

[45] Reissued * Apr. 5, 1983

[54] METHOD FOR CLEANING ALUMINUM AT LOW TEMPERATURES

[75] Inventor: Robert E. Binns, Roslyn, Pa.

[73] Assignee: Amchem Products, Inc., Ambler, Pa.

[ * ] Notice: The portion of the term of this patent subsequent to Feb. 22, 1994, has been disclaimed.

[21] Appl. No.: 189,743

[22] Filed: Sep. 23, 1980

Related U.S. Patent Documents

Reissue of:

[64] Patent No.: 4,124,407
Issued: Nov. 7, 1978
Appl. No.: 755,929
Filed: Dec. 30, 1970

U.S. Applications:

[60] Division of Ser. No. 755,928, Dec. 30, 1976, Pat. No. 4,116,853, and a continuation-in-part of Ser. No. 607,154, Aug. 25, 1975, Pat. No. 4,009,115, which is a continuation-in-part of Ser. No. 442,726, Feb. 14, 1974, abandoned.

[51] Int. Cl.[3] ..... B08B 3/08; C23G 1/12

[52] U.S. Cl. ..... 134/3; 134/10; 134/40; 134/41; 252/142

[58] Field of Search ..... 134/3, 10, 40, 41; 252/142-145, 79.3, 79.4; 204/35 R

[56] References Cited

U.S. PATENT DOCUMENTS

| | | | |
|---|---|---|---|
| Re. 27,662 | 6/1973 | Hamilton . | |
| 2,040,618 | 5/1936 | Mason et al. . | |
| 2,316,220 | 4/1943 | Brown et al. . | |
| 2,376,082 | 5/1945 | Pullen . | |
| 2,413,365 | 12/1946 | McCoy . | |
| 2,477,181 | 7/1949 | Holman . | |
| 2,719,796 | 10/1955 | Kappes et al. . | |
| 2,762,694 | 9/1956 | Newman . | |
| 2,828,193 | 3/1958 | Newman . | |
| 3,138,485 | 6/1964 | Kaveggia et al. . | |
| 3,140,203 | 7/1964 | Grunwald . | |
| 3,220,899 | 11/1965 | Leonard . | |
| 3,275,562 | 9/1966 | Smith . | |
| 3,367,799 | 2/1968 | Beyerle . | |
| 3,448,055 | 6/1969 | Mickelson et al. . | |
| 3,494,795 | 2/1970 | Chang | 134/40 |
| 3,634,262 | 1/1972 | Grunwald et al. . | |
| 3,969,135 | 7/1976 | King et al. | 134/41 |

FOREIGN PATENT DOCUMENTS

| | | |
|---|---|---|
| 825546 | 5/1975 | Belgium . |
| 536710 | 2/1957 | Canada . |
| 850046 | 8/1970 | Canada . |
| 868314 | 4/1971 | Canada . |
| 1202615 | 10/1965 | Fed. Rep. of Germany . |
| 881701 | 5/1943 | France . |
| 50-115630 | 9/1975 | Japan . |
| 543770 | 3/1942 | United Kingdom . |
| 877240 | 9/1961 | United Kingdom . |

OTHER PUBLICATIONS

Hess et al., "The Surface Treatment at Room Temperature of Al Alloys for Spot Welding", *J. American Welding Soc.*, Sep. 1944, pp. 417s–423s.

Akers et al., "Cleaning Aluminum", *Soap and Sanit. Chem.*, vol. 17, Apr. 1941, pp. 25–27, 71, 73–74.

Wernick et al., *Surface Treatment and Finishing of Aluminum and its Alloys*, 1956, pp. 74, 89, 129, 147.

Harris et al., *Annotated Bibliography of Aluminum Cleaning*, Jan. 1943, (pp. 33–36); Mar. 1943 (pp. 33–38); May 1944 (pp. 35–40).

Amchem Products, Inc. Data Sheet, "Ridoline" 121/122/123, Apr. 1975, all pages pertinent.

Harris, Metal Cleaning Bibliographical Abstracts, Publ. No. 90 (1949–pp. 1–68); Publ. No. 90A (1950, pp. 1–27); Publ. No. 90D (1957, pp. 1–38).

Mona Industries Inc., "Monaterge LF-945", *Tech. Bulletin No. 230*, Dec. 1975, pp. 1–2.

*Primary Examiner*—Marc L. Caroff
*Attorney, Agent, or Firm*—Alexis Barron

[57] ABSTRACT

Lubricants and metallic fines are removed from aluminum surfaces by contacting the surfaces with an aqueous solution containing an active fluoride compound, sulfuric acid, and a surfactant.

16 Claims, 1 Drawing Figure

* GRAMS / LITER - HYDROFLUORIC ACID

METHOD FOR CLEANING ALUMINUM AT LOW TEMPERATURES

Matter enclosed in heavy brackets [ ] appears in the original patent but forms no part of this reissue specification; matter printed in italics indicates the additions made by reissue.

BACKGROUND OF THE INVENTION

This is a Continaution-In-Part application of application Ser. No. 607,154, filed on Aug. 25, 1975, now U.S. Pat. No. 4,009,115, which is a continuation-in-part application of application Ser. No. 442,726 filed on Feb. 14, 1974, now abandoned. This application is a divisional application of copending application Ser. No. 755,928, filed on Dec. 30, 1976, *now U.S. Pat. No. 4,116,853*. The entire disclosures of all of said applications are hereby incorporated by reference.

Containers comprised of aluminum and alloys thereof are produced in a drawing and forming operation, referred to as "drawing and ironing", which results in the deposition of lubricants and forming oils on the surface. In addition, residual aluminum fines, i.e. small particles of aluminum, are deposited on the interior and exterior surfaces of the container during the forming operation. Ordinarily, the exterior surface of the container will have smaller quantities of aluminum fines since during the drawing and ironing step the exterior surface is not subject to as much abrasion from the die as the interior surface.

Prior to any processing steps, such as conversion coating and sanitary lacquer deposition, the surfaces of the aluminum containers must be clean and water-break-free so that there are no contaminants which prevent further processing and which render the containers unacceptable for use.

Acid cleaners have been employed to clean the aluminum surfaces and to remove aluminum fines deposited on the interior walls of aluminum containers. Acid cleaning is ordinarily accomplished at temperatures from 185° F. to 200° F. in order to remove or dissolve the aluminum fines and to remove the lubricants and forming oils so that the surface is rendered water-break-free. The cleanliness of the aluminum surface is measured by the ability of the interior and exterior surfaces of the formed aluminum container to support a continuous break-free film of water, that is to be water-break-free.

Due to the high temperatures at which cleaning is accomplished, that is from 185° F. to 200° F., and the acidity of the cleaning composition, the processing equipment employed to heat the cleaning composition, particularly the fire tubes of gas fired heat exchangers, are susceptible to corrosion. Furthermore, the high temperatures increase operating costs and fuel consumption.

Chromic acid or salts thereof have been utilized to minimize the corrosion of the processing equipment by inhibiting the corrosive attack of the acid cleaning composition on the processing equipment. An important shortcoming which cleaners of this kind possess is the inherent toxicity of the hexavalent and trivalent chromium compounds contained therein and the resultant waste disposal problem created by the presence of chromium in the cleaner effluent.

Attempts have been made to include other additives in the cleaning compositions to provide efficient cleaning. Such additives have included fluoride. Maintenance and control of acidic cleaners at low pH's has proven impractical, especially when fluorides are present. Furthermore, as such cleaning is effected at high temperatures, the fluoride when present in high concentrations can attack the metal surface and etch the surface which is undesirable, especially when cleaning of containers is to be effected.

The principal object of this invention is to provide a cleaning composition for aluminum for removing and dissolving aluminum fines and for cleaning lubricating oils from the aluminum surface.

An object of this invention is to provide a process for cleaning aluminum surfaces at low temperatures thereby reducing corrosion and attack of processing equipment and reducing heating costs and heating fuel consumption.

An added object of this invention is to provide a cleaning composition possessing good cleaning ability and preventing corrosive attack of processing equipment while having no chromate therein.

Another object is to provide a cleaning solution which produces no sludge during operation.

A concomitant object of this invention is to provide a cleaning solution having relatively low concentrations of hydrofluoric acid, which can be easily controlled and which enables the cleaning of aluminum surfaces with little or no etching of the surface.

DETAILED DESCRIPTION OF THE INVENTION

Figure 1:
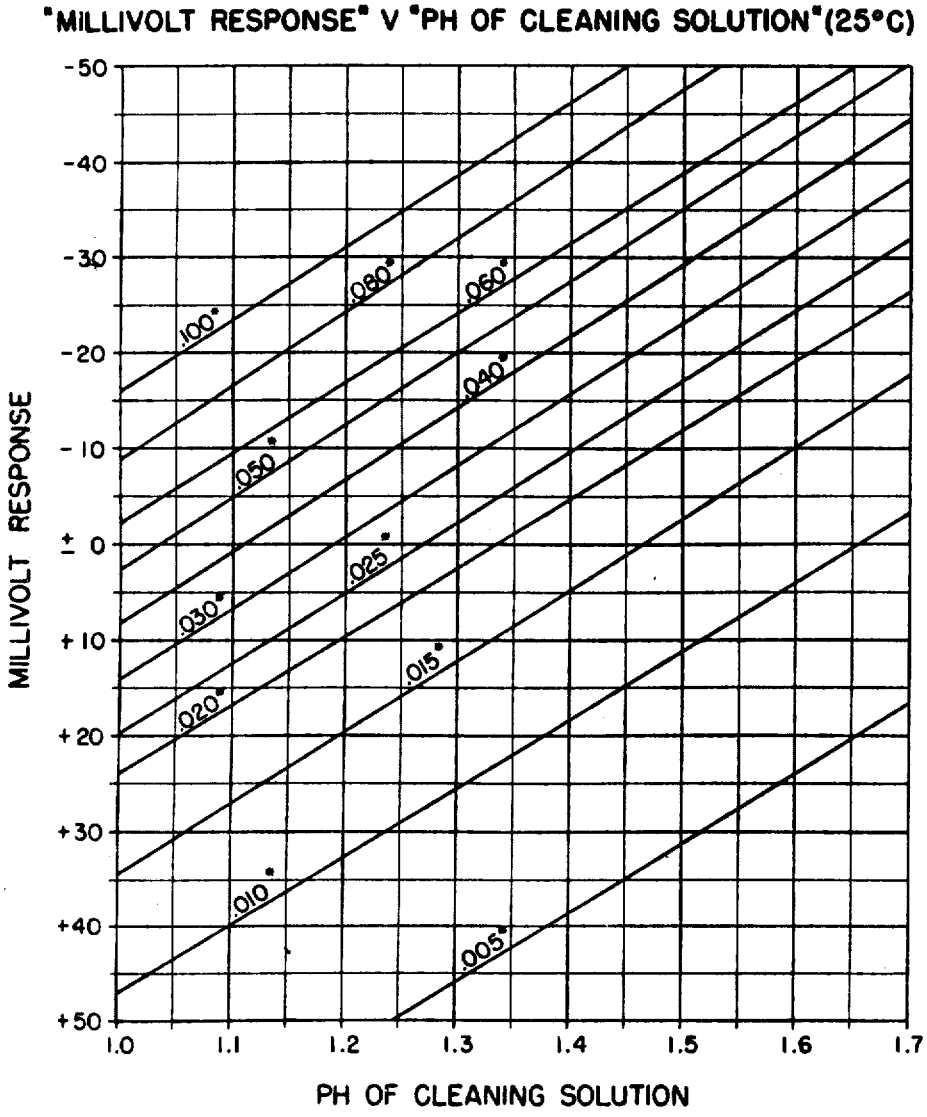

I have discovered a composition and process for removing and dissolving aluminum fines and lubricating oils from an aluminum surface, said composition comprising a concentration of hydrofluoric acid of from about 0.005 to about 0.7 grams per liter and a sufficient concentration of sulfuric acid to maintain the pH between about 0.6 and about 2.5 ordinarily below 2.0. When the foregoing aqueous cleaning composition is utilized removing and dissolving aluminum fines and lubricating oils may be accomplished at temperatures as low as from about 70° F. to about 140° F.

It should be understood that the term aluminum surface used herein includes aluminum and aluminum alloys in which aluminum is the principal constituent. It should be understood that by "cleaning composition", or "cleaning solution" I mean the aqueous acidic cleaning bath of the present invention comprising hydrofluoric acid and sulfuric acid.

The surprising results obtained with the use of the cleaning solution include the removal and dissolution of aluminum fines from a formed aluminum container, both on the interior walls and dome of said container, at temperatures within the range of from about 70° F. to about 140° F. In addition, it has been found that with the use of the cleaning solution of the present invention corrosive attack of the processing equipment, particularly the fire tubes of gas fired heat exchangers, is reduced considerably. This is accomplished without the use of any inhibitors in the cleaning solution, such as hexavalent chromium.

I have found that active fluoride is a necessary constituent which is responsible for assisting in dissolution of the aluminum fines and oil film removal. In the present cleaning process it is essential that the active fluoride be maintained within specified limits, since the active fluoride affects the aluminum fine dissolution and oil film removal.

The term "active fluoride" means the fluoride present in the operating cleaning solution and measurable at a given pH by a fluoride sensitive electrode of the potentiometric type. For example, electrodes of this type and their use are described in U.S. Pat. No. 3,431,182 which is hereby incorporated by reference. The electrodes described therein are known to the art as fluoride specific ion electrodes.

Due to the low concentration of hydrofluoric acid in the cleaning solution of this invention, a potentiometric type electrode is found to be preferable for measuring active fluoride. Other measuring devices that are not of the potentiometric type are insensitive to the concentration of hydrofluoric acid in the cleaning solutions of the present invention, as they are useful only in concentrated solutions or solutions having higher concentrations of hydrofluoric acid.

With the use of the potentiometric type electrode, the active fluoride measurement is measured as a potential which is proportional to or related to the actual fluoride ion concentration in the solution.

It is known that in acid solutions containing fluoride, hydrogen ion complexes a portion of the fluoride forming undissociated HF and $HF_2^-$. In addition, when aluminum is dissolved in such solutions, $Al^{+3}$ also complexes fluoride. Due to the presence of these complexing agents, it is difficult to measure actual free fluoride ion concentration without extensive sample manipulation. However, by the use of the potentiometric type electrode, once a reference point has been arrived at by measuring a make-up cleaning solution potential and taking this potential as the zero point, it is inconsequential how much fluoride is actually complexed. The potential increases negatively in more concentrated solutions, that is when the active fluoride concentration increases, and the potential increases positively in more dilute solutions, that is when the active fluoride concentration decreases. When aluminum ions enter the solution as aluminum fines are removed from the surface, the electrode potential becomes more positive as the amount of active fluoride decreases. When additions of hydrofluoric acid are effected, the potential becomes less positive and approaches the zero point again. Since the potentiometric type electrode will measure the active fluoride in the solution, taking no account of any complexed fluoride, additions of active fluoride, preferably as hydrofluoric acid, can be made to the operating cleaning solution to return the potential measurement to the original zero reference point.

Such potentiometric type electrodes may also be utilized to measure the actual concentration of hydrofluoric acid present in a cleaning composition. Exemplary of a procedure which may be utilized to determine the concentration of hydrofluoric acid in a cleaning solution is as follows:

EXEMPLARY PROCEDURE FOR DETERMINING HYDROFLUORIC ACID CONCENTRATION

Utilizing standard solutions and a potentiometric type electrode, standard curves of "Millivolt Response" vs "pH of Cleaning Solution", at various concentrations of hydrofluoric acid are determined. FIG. 1 is exemplary of such standard curves.

The potentiometric type electrode used to prepare FIG. 1 and which may be utilized for determining the concentration of hydrofluoric acid is generally, any pH meter with an expanded millivolt scale, equipped with an Orion fluoride ion electrode and a standard calomel reference electrode. Exemplary of such meters are the Ionalyzer® Fluoride Ion Activity Electrode Model 94-09 (Orien Research, Incorporated).

In order to measure the concentration of hydrofluoric acid in a sample cleaning solution three standard solutions are prepared:

Cleaning Solution Standard I–0.010 grams/liter HF
Cleaning Solution Standard II–0.020 grams/liter HF
Cleaning Solution Standard III–0.040 grams/liter HF The above standard solutions are prepared from hydrofluoric acid and a sufficient concentration of sulfuric acid to maintain the pH between 1.29 and 1.45 at 25° C. and, optionally surfactants, that is, from ingredients substantially similar to the sample cleaning composition for which the concentration of hydrofluoric acid is to be determined.

The following procedures should be followed:

Step 1. Rinse electrodes with DI water and wipe dry with soft tissue paper.

Step 2. Immerse the electrodes into Cleaning Solution Standard II. The [soluton] *solution* should be stirred or swirled during measurements. Switch the function selector to the expanded millivolt scale. At 100% slope and 25° C., adjust the meter response to read 0.0 millivolts using the calibration knob. This corresponds to 0.020 grams/liter HF;

Step 3. Repeat Step 1;

Step 4. Immerse the electrodes into one of the other solution standards. While stirring and having the meter set at 100% slope and 25° C., make the measurement. Cleaning Solution Standard I should read +18 millivolts ±2.0 m.v. Cleaning Solution Standard III should read −22 millivolts ±2.0 m.p.

This procedure should be carried out once every 24 hours under normal plant conditions. In case of deviations greater than indicated above the fluoride ion electrode should be checked by changing to a new fluoride ion electrode using the above procedure. After the correct fluoride ion electrode response has been established, Cleaning Solution Standard II should be used for standardization between sample measurements.

SAMPLE MEASUREMENT

After standardization and proper rinsing and drying of the electrodes, the sample to be checked should be cooled to 25° C. and the electrodes immersed into it. The bath sample should be stirred. After noting the millivolt response on the expanded scale, the pH of the bath sample is determined in a known manner. After establishing the correct pH and millivolt reading, the concentration of HF is determined by reading the value from, for example, FIG. 1.

Eg. At a pH of 1.1. and a m.v. reading of +20, the concentration is equivalent to 0.0185 grams/liter HF At pH 1.2 and +5 m.v.=0.025 grams/liter HF.

It has been discovered that as a cleaning solution is used, aluminum is dissolved off the surface being treated at a specific rate. In general, cleaning solutions of the present invention will have operating characteristics such that at make-up the aluminum dissolution rate is from about 8 to about 25 milligrams per square foot (0.009 to 0.027 mg/cm$^2$) of aluminum surface treated. It has been observed that best results, with minimal etch of the surface, are obtained when the aluminum dissolution rate is from 9 to 20 milligrams per square foot (0.01 to 0.022 mg/cm$^2$) of aluminum surface treated. This dissolution rate occurs at make-up of a cleaning solution having a preferred concentration of hydrofluoric acid of from about 0.005 to about 0.1 grams/liter of hydrofluoric acid. By establishing a zero potential point with a potentiometric type electrode at make-up of the cleaning solution, and by recording the potential measurements as metal surfaces are processed and cleaned, the aluminum dissolution rate is maintained within the preferred range by additions of active fluoride, preferably as hydrofluoric acid.

The potentiometric electrode is therefore used as a guideline for determining when to adjust the amounts of active fluoride in solution, also to maintain sufficient active fluoride therein to effect a desirable aluminum dissolution rate, and also in determining the hydrofluoric acid concentration of unknown cleaning solutions.

The active fluoride suitable for use herein is preferably added to the cleaning composition as hydrofluoric acid. A simple fluoride salt can also be utilized, for example, an alkali metal fluoride or bifluoride such as sodium fluoride, ammonium fluoride or bifluoride. Complex fluoride can be employed. However, greater concentrations of complex fluoride will be necessary to yield desirable amounts of active fluoride, as the hydrolysis of complex fluorides is not as substantial as with the simple fluoride, to liberate the required active fluoride.

The amount of active fluoride in the cleaning solution is expressed herein as a concentration of hydrofluoric acid. This means that the active fluoride is in the form of dissociated fluoride whose concentration is expressed as the concentration of hydrofluoric acid.

The active fluoride in the cleaning solution aids in the removal of aluminum fines on the metal substrate which have formed during the forming operation. A surprising aspect of this invention is that the cleaning process can be effected when the amount of hydrofluoric acid present in the solution, is as low as 0.005 grams/liter. I have found that by employing the preferred amount of hydrofluoric acid, resulting in the presence of sufficient active fluoride, removal of the aluminum fines is accomplished without vigorous attack of the underlying aluminum surface. Of course, should the active fluoride be depleted in the cleaning solution, preferably it can be replenished by addition of hydrofluoric acid.

Sulfuric acid in the cleaning solution should be present in sufficient concentration to maintain the pH between 0.6 and 2.5. This concentration of sulfuric acid is an amount from about 0.1 to about 60 grams/liter, preferably from about 1.0 to about 10 grams/liter. It is particularly preferred that the concentration of sulfuric acid be present in an amount from about 3 to about 5 grams/liter.

The hydrofluoric acid should be present in the cleaning solution in an amount from about 0.005 to about 0.7 grams/liter, preferably about 0.005 to about 0.1 grams/liter. For optimum results, it is preferred that the hydrofluoric acid be present in an amount from about 0.01 to about 0.03 grams/liter.

In the preferred embodiment of this invention an operating cleaning solution is employed comprising hydrofluoric acid and sulfuric acid wherein the concentration of constituents, at the beginning of operation as well as upon replenishment, is maintained such that the sulfuric acid is present in amount from about 3 to about 5 grams/liter, and the active fluoride is maintained at the level measured at make-up, that is when the hydrofluoric acid concentration at make-up is about 0.01 to about 0.03 grams/liter. When a cleaning solution is operated and maintained within these preferred limits it has been found that excellent cleaning of the aluminum surface will result. A most surprising result is that the surface will be free of oils and aluminum fines without the corrosive attack of processing equipment occurring.

The cleaning solution preferably is prepared by employing aqueous concentrates consisting of sulfuric acid and water, and hydrofluoric acid and water. The aqueous concentrates can be added to an appropriate amount of water to prepare a working cleaning solution having constituent concentrations and pH within the operative ranges set forth herein. Alternatively, the hydrofluoric acid and sulfuric acid can be prepared as a concentrate and can be added simultaneously as one component to water to form the aqueous cleaning composition at concentrations for use.

Surfactants are desirably included in the cleaning composition. Such materials enhance the cleaning performance considerably. It has been observed that the use of surfactants in the cleaning solution assist in more rapid wetting of the surface and the removal of lubricant and oils. The surface active agents to be employed herein can be anionic, cationic, or nonionic. Preferably nonionic or anionic surface active agents are used.

Examples of surface active agents that can be utilized are:

Tergitol Anionic—08 (Union Carbide Corporation) an anionic surfactant believed to be sodium 2-ethyl hexyl sulfate;

Triton DF-16 (Rohm & Haas Co.) a nonionic surfactant believed to be a modified polyethoxylated straight chain alcohol;

Polytergent S-505 LF (Oline Corp.) a nonionic surfactant believed to be a modified polyethoxylated straight chain alcohol;

Surfonic LF-17 (Jefferson Chemical Co.) a nonionic surfactant believed to be an alkyl polyethoxylated ether;

Plurafac RA-30 (BASF Wyandotte Corp.) a nonionic surfactant, believed to be a modified oxyethylated straight chain alcohol;

Plurafac D-25 (BASF Wyandotte Corp.) a nonionic surfactant believed to be a modified oxyethylated straight chain alcohol;

Triton X-102 (Rohm & Haas Co.) a nonionic surfactant believed to be an octyl phenoxy poly ethoxy ethanol;

Antarox BL 330 (GAF Corp.) a nonionic surfactant believed to be an alkyl poly (ethyl-eneoxy) ethanol;

Triton CF-10 (Rohm & Haas Co.) a nonionic surfactant, and believed to be an alkylaryl polyether having a carbon chain of about 14 carbon atoms and approximately 16 moles of ethoxylation;

Surfactant AR 150 (Hercules, Inc.) a nonionic surfactant, and believed to be an ethoxylated abietic acid derivative with approximately 15 moles of ethoxylation;

Pluronic L061 (BASF Wyandotte, Inc.) a nonionic surfactant, and believed to be a condensate containing only ethylene oxide and propylene oxide chains;

Antarox LF-330 (GAF Corp.) a nonionic surfactant, believed to be an alkyl poly(ethyleneoxy) ethanol;

Pegosperse 700-TO (Glyco Chemicals, Inc.) a nonionic surfactant, and believed to be an abietic acid ester containing approximately 14 to 16 moles of ethoxylation;

Igepal CA-630 (GAF Corp.) a nonionic surfactant, believed to be an alkyl phenoxy poly (ethyleneoxy) ethanol;

Trycol LF-1 (Emery Industries, Inc.) a nonionic surfactant believed to be an alkyl poly ether; and Renex 20 (I.C.I. United States, Inc.) a nonionic, polyoxyethylene ester of mixed fatty acids and resin acids.

The surface active agent present in the cleaning composition can be a combination of one or more particular surface active agents. The surface active agent can be present in the cleaning composition in an amount from about 0.1 to about 10 grams/liter.

Concentrates which may be used in the formulation of aqueous cleaning compositions are exemplified below.

CONCENTRATES CONTAINING HYDROFLUORIC ACID

| | Weight % |
|---|---|
| **FORMULA 1** | |
| 70% Hydrofluoric Acid | 20.55 |
| Water | 79.45 |
| | 100% |

Specific Gravity: 1.043 ± .005 at 60° F.
Freezing Point: −2° F.
Flash Point: None

| | |
|---|---|
| **FORMULA 2** | |
| Hydrofluoric Acid (70%) | 20.5 |
| non-ionic surfactant Plurafac D-25 | 3.0 |
| Water | 76.5 |
| | 100% |

Specific Gravity: 1.051 ± .005
Freezing Point: −5° F.
Flash Point: None
Cloud Point: 78° F.

CONCENTRATES CONTAINING SULFURIC ACID

| | Weight % |
|---|---|
| **FORMULA 3** | |
| 66° Sulfuric Acid | 34.52 |
| water | 65.48 |
| | 100% |

Specific Gravity: 1.239 ± .005 at 60° F.

| | FORMULAS 4–8 Weight % | | | | |
|---|---|---|---|---|---|
| | 4 | 5 | 6 | 7 | 8 |
| 66° Be Sulfuric Acid | 45 | 45 | 34.3 | 34.2 | 34.2 |
| Non-ionic Surfactant Surfonic LF-17 | 10 | 14 | 5.3 | 7.5 | 10.6 |
| Water | 45 | 41 | 60.4 | 58.3 | 55.2 |
| | 100% | 100% | 100% | 100% | 100% |
| Specific Gravity [at 60° F. (±.005)] | 1.337 | 1.335 | 1.246 | 1.248 | 1.249 |
| Freezing Point | Below 0° F. | Below 0° F. | Below 0° F. | Below 0° F. | Below 0° F. |
| Flash Point | None | None | None | None | None |

| | FORMULAS 9–10 Weight % | | | |
|---|---|---|---|---|
| | 9 | | 10 | |
| 66° Be Sulfuric Acid | 45.0 | | 45.58 | |
| Non-ionic Surfactants | 10.0 | | 10.90 | |
| Triton DF-16 | | 9.3 | | 10.12 |
| Plurafac D-25 | | .7 | | .78 |
| Water | 45.0 | | 43.52 | |
| | 100% | | 100% | |
| Specific Gravity [at 60° F. (±.005)] | 1.318 | | 1.320 | |

-continued

CONCENTRATES CONTAINING SULFURIC ACID

| | | |
|---|---|---|
| 66° Be Sulfuric Acid | 34.50 | |
| Non-ionic Surfactants | 5.00 | |
| Triton DF-16 | | 4.62 |
| Plurafac D-25 | | .38 |
| Water | 60.50 | |
| | 100% | |

Specific Gravity: 1.235 ± .005 at 60° F.
Freezing Point: Below 0° F.

| FORMULA 12 | Weight % | |
|---|---|---|
| 66° Be Sulfuric Acid | 34.50 | |
| Non-ionic Surfactants | 7.00 | |
| Triton DF-16 | | 5.43 |
| Plurafac D-25 | | 1.57 |
| Water | 58.50 | |
| | 100% | |

Specific Gravity: 1.237 ± .005 at 60° F.
Freezing Point: Below 0° F.
Flash Point: None

| FORMULA 13 | Weight % | |
|---|---|---|
| 66° Be Sulfuric Acid | 34.50 | |
| Non-ionic Surfactants | 7.0 | |
| Plurafac RA-30 | | 4.0 |
| Plurafac D-25 | | 3.0 |
| Water | 58.50 | |
| | 100% | |

Specific Gravity: 1.236 ± .005 at 60° F.
Freezing Point: Below 0° F.
Flash Point: None

CONCENTRATES CONTAINING SURFACTANTS

| FORMULA 14 | Weight % |
|---|---|
| Non-ionic surfactant Plurafac D-25 | 100% |

Specific Gravity: 1.010 ± .005 at 60° F.
Freezing Point: 0° F. (−18° C.)
Flash Point: 465° F.
Refractive Index: 1.4560 at 25° C. (77° F.)

| FORMULA 15 | Weight % |
|---|---|
| Anionic Surfactant Tergitol Anionic-08 | 100% |

Specific Gravity: 1.144 ± .005 at 20° C.
Freezing Point: +22° F.
Flash Point: None

| FORMULA 16 | Weight % |
|---|---|
| Non-ionic Surfactant Triton DF-16 | 100% |

Specific Gravity: .984 ± .005
Flash Point: None

| FORMULA 17 | Weight % |
|---|---|
| Non-ionic Surfactant Surfonic LF-17 | 30.0 |
| Sodium Nitrite | .01 |
| Water | 69.9 |
| | 100% |

Specific Gravity: 1.018 ± .005 at 60° F.
The sodium nitrite is added to inhibit rusting of the steel shipping containers

| FORMULA 18 | Weight % | |
|---|---|---|
| Non-ionic surfactants | 30.0 | |
| Plurafac RA-30 | | 27.9 |
| Plurafac D-25 | | 2.1 |

-continued

| CONCENTRATES CONTAINING SURFACTANTS | |
|---|---|
| Isopropanol (91%) | 3.3 |
| Water | 66.7 |
| | 100% |

Specific Gravity: 1.00 ± .005
Freezing Point: 32° F.
Flash Point: 140° F. T.C.C.
Aqueous cleaning compositions which may be employed are exemplified below.

| FORMULA 19 | Grams |
|---|---|
| Hydrofluoric Acid | 0.02 |
| Sulfuric Acid | 4.0 |
| Anionic Surfactant | 1.0 |
| Tergitol 08 | |
| Water to make 1 liter | |

| FORMULA 20 | Grams |
|---|---|
| Hydrofluoric Acid | .005 |
| Sulfuric Acid | 6.0 |
| Nonionic Surfactant | 1.0 |
| Triton DF 16 | |
| Water to make 1 liter | |

| FORMULA 21 | Grams |
|---|---|
| Hydrofluoric Acid | 0.1 |
| Sulfuric Acid | 4.0 |
| Nonionic Surfactant | 2.0 |
| Plurafac RA-30 | |
| Water to make 1 liter | |

The metal surface should be cleaned employing techniques that result in a completely water-break-free surface. The cleaning solution can be applied to the aluminum surface utilizing any of the contacting techniques to the art. Preferably, application will be effected by conventional spray or immersion methods. The time of treatment of the surface with the cleaning solution need only be long enough to insure complete wetting of the surface and can be as long as 10 minutes. Preferably, the surface should be treated for a time from about 15 seconds to about 2 minutes.

The aluminum fines and forming oils are removed from the aluminum surface by the cleaning solution at temperatures lower than ordinarily expected. The cleaning process can be operated at temperatures from about 70° F. to about 140° F., preferably from about 90° F. to about 135° F. It is highly preferred that the cleaning process be operated at temperatures from about 110° F. to about 125° F. Optimum results are obtained when the cleaning process is operated at temperatures from about 120° F. to about 125° F. This is a distinct advantage of the present invention over prior art processes, as the low operating temperatures with good cleaning results prevents accelerated corrosion and attack of processing equipment.

In accordance with the invention the cleaning solution is highly acidic, having pH below 2.5. The amount of sulfuric acid and hydrofluoric acid can be varied within limits in accordance with the ranges set forth hereinabove so that the pH of the cleaning solution can be adjusted. Preferably the pH of the cleaning solution is adjusted to from about 1.0 to about 1.8, and optimum results, that is excellent cleaning with minimal etching, are obtained when the pH of the cleaning solution is adjusted to from about 1.2 to about 1.5. The pH of the cleaning solution should not go below 0.6 or excessive etching will occur.

In accordance with broader aspects of the invention, there is considerable flexibility available with respect to portions of the overall processing of the aluminum substrate. In particular, chemical processing steps can be effected prior to cleaning such as, for example, a hot water prerinse of the surface. Following application of the cleaning solution, the surface can be rinsed with water and then dried. Ordinarily a water rinse is necessary to remove any remaining residues which may have remained after the cleaning step. After the rinse step, the aluminum surface may be contacted with conversion coating solutions or siccative finish coating compositions well known to the art. Generally, the coating solution will be applied directly after the cleaning operation or a short period of time thereafter. However, as specified hereinabove, the cleaned surface can be dried and the coating steps may be accomplished at a later time.

The following Examples are illustrative of this invention and are not considered as limiting for other materials and operating conditions falling within the scope of this invention which might be substituted.

EXAMPLE I

Aluminum container test specimens of 3004 alloy, drawn into single piece containers, were employed in this procedure. The containers had been subjected to a drawing operation and were covered with aluminum fines and drawing oils.

The test specimens were treated as follows:

1. Treated for 60 seconds by spraying the interior and exterior of the specimens with the solutions listed in Table 1.

2. Rinsed with water by immersion in cold water for 30 seconds at ambient temperature.

Control specimens were treated with aqueous compositions comprising acids, as indicated in Table 1, such as sulfuric, hydrochloric, phosphoric, and nitric acid, as well as specified combinations or mixtures of these acids. The concentrations of the aqueous solutions and the constituents therein are listed in Table 1. The temperature of each of the respective solutions when employed to treat the test and control specimens is listed in Table 1.

Except when an anionic surfactant (Tergitol 08) was employed in the solutions as indicated in Table 1, all other compositions contained 0.1 grams/liter of a nonionic surfactant (.1 gram/liter of Triton X-102).

In all cases the pH of the cleaning solutions were between 0.6 and 2.5.

The aluminum surfaces were tested for water-break following cleaning. The container surfaces were treated by measuring the percent of water-break on the surface, that is the percent of the total surface area which did not support a continuous film of water. The results are listed in Table 1.

The results reported in Table 1 include a determination of the presence of aluminum fines remaining on the surface after processing was completed. The brightness and appearance of the test specimens at the end of the processing procedure was also observed. The brightness quality was determined by visually rating the degree of brightness of the surface from 1 to 5 wherein the brightness rating of 1 represents best performance and appearance and rating of 5 represents poor appearance. The presence of aluminum fines on the interior surface was determined by rubbing the surface with a clean white cloth and observing the fines deposited on the cloth. The presence of fines is evidenced by a dark black residue on the white cloth. The amount of fines present is expressed in Table 1 in gradations from excellent (E) for no residue, good (G) for very light residue, fair (F) for moderate residue, to poor (P) for very heavy residue.

TABLE 1

| | Temperature | Percent Waterbreak Exterior | Percent Waterbreak Interior | Interior Wipe | Interior Appearance |
|---|---|---|---|---|---|
| Aqueous Composition | | | | | |
| 2 g/l $H_2SO_4$ | 150° F. | 80 | 80 | G | 4 |
| 4 g/l $H_2SO_4$ | 150° F. | 60 | 30 | F | 4 |
| 6 g/l $H_2SO_4$ | 150° F. | 50 | 10 | P | 4 |
| 2 g/l HCl | 150° F. | 100 | 90 | G | 4 |
| 4 g/l HCl | 150° F. | 100 | 80 | G | 4 |
| 6 g/l HCl | 150° F. | 100 | 80 | G | 4 |
| 2 g/l $H_3PO_4$ | 150° F. | 90 | 80 | G | 4 |
| 4 g/l $H_3PO_4$ | 150° F. | 50 | 80 | E | 4 |
| 6 g/l $H_3PO_4$ | 150° F. | 70 | 50 | E | 3 |
| 2 g/l $HNO_3$ | 150° F. | 100 | 100 | E | 5 |
| 4 g/l $HNO_3$ | 150° F. | 100 | 90 | E | 5 |
| 6 g/l $HNO_3$ | 150° F. | 100 | 90 | G | 5 |
| 2 g/l $H_2SO_4$ + 2 g/l HCl | 150° F. | 90 | 30 | P | 3 |
| 3 g/l $H_2SO_4$ + 3 g/l HCl | 150° F. | 80 | 30 | P | 3 |
| Bath Composition | | | | | |
| 2 g/l $H_2SO_4$ + 2 g/l $H_3PO_4$ | 150° F. | 70 | 5 | F | 2 |
| 3 g/l $H_2SO_4$ + 3 g/l $H_3PO_4$ | 150° F. | 70 | 5 | G | 2 |
| 2 g/l $H_2SO_4$ + 2 g/l $HNO_3$ | 150° F. | 90 | 30 | P | 3 |
| 3 g/l $H_2SO_4$ + 2 g/l $HNO_3$ | 150° F. | 90 | 5 | P | 3 |
| 2 g/l $H_2SO_4$ + $H_3PO_4$ | 120° F. | 100 | 10 | P | 4 |
| 3 g/l $H_2SO_4$ + 3 g/l $H_3PO_4$ | 120° F. | 100 | 10 | P | 4 |
| 4 g/l $H_2SO_4$ + 0.01 g/l $NH_4HF_2$ | 120° F. | 80 | 50 | P | 4 |
| 4 g/l $H_2SO_4$ + 0.02 g/l $NH_4HF_2$ | 120° F. | 50 | 10 | P | 4 |
| 4 g/l $H_2SO_4$ + 0.04 g/l $NH_4HF_2$ | 120° F. | 20 | 0 | G | 2 |
| 4 g/l $H_2SO_4$ + 0.05 g/l $NH_4HF_2$ | 120° F. | 10 | 0 | E | 1 |
| 4 g/l $H_2SO_4$ + 1 g/l anionic surfactant + .02 g/l HF | 120° F. | 0 | 0 | E | 1 |
| 10.0 g/l $H_2SO_4$ + 1.0 g/l anionic surfactant + 0.005 g/l HF | 135° F. | 0 | 0 | G | 2 |
| 1.0 g/l $H_2SO_4$ + 1.0 g/l anionic surfactant + 0.10 g/l HF | 110° F. | 0 | 0 | E | 1 |

EXAMPLE II

An aqueous acidic cleaning bath was prepared by adding 4.0 grams of sulfuric acid, 0.02 grams of hydrofluoric acid, and 1.0 gram of an anionic surfactant (Tergitol 08) to each one liter of water. The temperature of the bath was elevated to and maintained at 120° F. A fluoride specific ion electrode and a saturated calomel reference electrode were coupled to a potentiometric meter capable of discerning changes in electrode potential of ±1.0 millivolt. The electrodes were immersed into the bath and the meter adjusted, by the zero offset control, to read on the center of the scale.

Aluminum containers of 3004 alloy drawn into single piece containers were sprayed with the prepared bath and the meter readings became more positive. When the electrode potential reached +3 millivolts from center scale, hydrofluoric acid additions were made to restore the electrode potential to center scale. Electro metric pH measurements, and sulfuric acid additions were made to maintain the pH at 1.3 to 1.5.

The containers were observed to be water-break-free and bright in appearance.

EXAMPLE III

An aqueous acidic cleaning bath was prepared by adding 4.0 grams of sulfuric acid, 0.02 grams of hydrofluoric acid, and 1.0 gram of a nonionic surfactant (Triton DF-16) to each one liter of water. The temperature of the bath was elevated to and maintained at 120° F. A fluoride specific ion electrode and a saturated calomel reference electrode were coupled to a potentiometric meter capable of discerning changes in electrode potential of ±1.0 millivolt. The electrodes were immersed into the bath and the meter adjusted, the zero offset control, to read on the center of the scale.

Aluminum containers of 3004 alloy drawn into single piece containers were sprayed with the prepared bath and the meter readings became more positive. When the electrode potential reached +5 millivolts from center scale, hydrofluoric acid additions were made to restore the electrode potential to center scale. Electro metric pH measurements, and sulfuric acid additions were made to maintain the pH at about 1.2.

The containers were observed to be water-break-free and bright in appearance.

EXAMPLE IV

Aluminum container test specimens, drawn into single piece containers, were employed in this procedure. The containers had been subjected to a drawing operation and were covered with aluminum fines and drawing oils.

The test specimens were treated as follows:

1. Treated for various times of from 20 to 60 seconds and various temperatures by spraying the interior and exterior of the specimens with the solutions listed in table 2.

2. Rinsed with water by immersion in cold water for about 30 seconds at ambient temperature.

All of the cleaning solutions contained 1.2 grams/liter of surfactant comprising 92.86% Triton DF-16 and 7.14% Plurafac D-25.

The aluminum surfaces were tested for water-break following cleaning. The container surfaces were treated by measuring the percent of water-break on the surface, that is the percent of the total surface area which did not support a continuous film of water. Separate evaluations were made for the interior and exterior of the cans.

The results reported in Table 2 include a determination of the presence of aluminum fines remaining on the surface after processing by observing the brightness of the cans.

The degree of etching of the test specimens at the end of the processing procedure was also observed.

The interior and exterior appearance (brightness quality—removal of fines) was determined by visually rating the degree of brightness of the surface excellent, good, fair, or poor (E,G,F,P), "Excellent" meaning that all fines are removed, "Good" meaning most fines are removed, "Fair" meaning few fines are removed, and "Poor" meaning no fines are removed.

TABLE 2

| Test Number | Temperature (°F.) | Aqueous Composition $H_2SO_4$ (g/l) | Aqueous Composition HF (g/l) | Percent Waterbreak Exterior | Percent Waterbreak Interior | Appearance (Fines) Interior | Appearance (Fines) Exterior |
|---|---|---|---|---|---|---|---|
| 1 | 70 | 35.21 | 0.252 | 2.5 | 1.0 | E | E |
| 2 | 70 | 35.21 | 0.336 | 1.5 | .5 | E | E |
| 3 | 70 | 23.47 | 0.336 | 3.5 | 1.0 | E | G |
| 4 | 70 | 46.94 | 0.504 | 0 | 0 | E | E |
| 5 | 90 | 11.74 | 0.252 | .5 | 0 | E | E |
| 6 | 90 | 0.117 | 0.252 | 2.5 | 1.0 | E | E |
| 7 | 90 | 0.117 | 0.336 | .5 | 0 | E | E |
| 8 | 90 | 0.117 | 0.504 | 0 | .5 | E | E |
| 9 | 84 | 35.21 | 0.336 | 3.0 | 3.0 | G | E |
| 10 | 90 | 46.94 | 0.672 | 1.5 | .5 | E | G |
| 11 | 90 | 58.68 | 0.672 | 5.0 | 1.5 | E | E |
| 12 | 125 | 5.87 | 0.042 | 5.0 | 3.5 | G | G |
| 13 | 125 | 5.87 | 0.336 | 2.5 | 0 | E | E |
| 14 | 125 | 1.17 | 0.336 | 2.5 | 2.5 | E | E |
| 15 | 125 | 5.87 | 0.336 | 3.5 | 0 | E | E |
| 16 | 125 | 5.87 | 0.672 | 1.0 | 1.0 | E | E |
| 17 | 140 | 5.87 | 0.336 | 1.0 | 0 | E | E |
| 18 | 140 | 3.51 | 0.336 | 1.0 | .5 | E | E |
| 19 | 140 | 3.51 | 0.336 | 2.5 | .5 | E | E |
| 20 | 140 | 2.34 | 0.336 | 5.0 | 2.5 | E | E |
| 21 | 140 | 58.68 | 0.672 | 5.0 | 3.0 | E | E |
| 22 | 140 | 5.87 | 0.252 | 1.0 | 3.5 | E | E |
| 23 | 140 | 5.87 | 0.168 | 3.5 | 3.5 | E | E |
| 24 | 125 | 3.51 | 0.672 | .5 | 1.0 | E | E |

What is claimed is:

1. A process for cleaning an aluminum surface *having thereon deposits of aluminum fines and lubricant consisting essentially of removing said deposits* by contacting said surface with an aqueous cleaning solution comprising hydrofluoric acid in a comcentration of about 0.005 to about 0.1 gram per liter of said aqueous cleaning solution and sulfuric acid in a concentration of about 1.0 to about 10 g/l of said aqueous cleaning solution and having a surfactant dissolved therein, *wherein the aluminum of said surface is 3004 alloy or an aluminum alloy substantially equivalent thereto.*

2. A process according to claim 1 wherein the amount of sulfuric acid in said cleaning solution is sufficient to reduce the pH of less than 1.8.

3. A process according to claim 2 wherein the aqueous cleaning solution is contacted with an aluminum surface by spraying said solution on to the surface.

4. The process according to claim 3 wherein the temperature of the spray solution is below 135° F.

5. The process according to claim 4 wherein the aluminum surface is sprayed with said aqueous cleaning solution for periods of less than about 2 minutes.

6. A process according to claim 4 wherein the aluminum surface is an aluminum can.

7. A process for cleaning aluminum surfaces [to remove] *having thereon deposits of aluminum fines and lubricants consisting essentially of removing said* lubricants and metallic fines [which comprises] *by* contacting said surface with an aqueous cleaning solution, comprising active fluoride expressed as hydrofluoric acid at a concentration in said solution of about 0.005 to about 0.1 gram per liter and sulfuric acid in a concentration of about 1.0 to about 10 g/l of said aqueous cleaning solution and having a surfactant dissolved therein, *wherein the aluminum of said surface is 3004 alloy or aluminum alloy substantially equivalent thereto.*

8. A process according to claim 7 wherein an aluminum surface is contacted with said aqueous cleaning solution by spraying said surface with said solution at a temperature below 135° F. for a period of less than about 2 minutes.

9. A process according to claim 7 wherein said aluminum surface is contacted with said aqueous cleaning solution by immersing said aluminum surface into a bath containing said aqueous solution maintained at a temperature below about 135° F.

10. A process according to claim 9 wherein the time of immersion is less than about 2 minutes.

11. A process according to claim 7 wherein the active fluoride concentration of the cleaning solution is maintained at a level equivalent to a make-up concentration of about 0.005 to about 0.1 gram per liter of hydrofluoric acid while said solution is continuously used in cleaning aluminum surfaces by adding hydrofluoric acid to the solution at a rate sufficient to maintain electrode potential of the solution as measured by a fluoride specific ion electrode placed in the solution substantially constant and adding sulfuric acid at a rate sufficient to maintain the pH of the solution substantially constant.

12. A process according to claim 11 wherein the aluminum surface is an aluminum can.

13. A process according to claim 11 wherein the concentration of active fluoride in the cleaning solution expressed as concentration of hydrofluoric acid is maintained between about 0.005 and about 0.03 gram per liter.

*14. A process for cleaning an aluminum surface having thereon deposits of aluminum fines and lubricant consisting essentially of removing said deposits by contacting said surface with an aqueous cleaning solution consisting essentially of hydrofluoric acid in a concentration of about 0.005 to about 0.1 g/l of said aqueous cleaning solution and sulfuric acid in a concentration of about 1.0 to about 10 g/l of said aqueous cleaning solution and having a surfactant dissolved therein.*

*15. A process for cleaning an aluminum surface having thereon deposits of aluminum fines and lubricant, the aluminum of said surface being 3004 alloy or an alumi-*

*num alloy substantially equivalent thereto, consisting essentially of removing said deposits by contacting said surface with an aqueous cleaning solution consisting essentially of hydrofluoric acid in a concentration of about 0.005 to about 0.1 g/l of said aqueous cleaning solution and sulfuric acid in a concentration of about 1.0 to about 10 g/l of said aqueous cleaning solution and having a surfactant dissolved therein.*

*16. A process according to claim 14 or 15 wherein said surface is that of an aluminum can.*

* * * * *